(12) United States Patent
Friedrich et al.

(10) Patent No.: US 10,031,681 B2
(45) Date of Patent: Jul. 24, 2018

(54) VALIDATING VIRTUAL HOST BUS ADAPTER FABRIC ZONING IN A STORAGE AREA NETWORK

(71) Applicant: International Business Machines Corporation, Armonk, NY (US)

(72) Inventors: Ralph Friedrich, Boeblingen (DE); Raymond M. Higgs, Poughkeepsie, NY (US); George P. Kuch, Poughkeepsie, NY (US); Elizabeth A. Moore, San Jose, CA (US); Richard M. Sczepczenski, Poughkeepsie, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 32 days.

(21) Appl. No.: 15/206,514

(22) Filed: Jul. 11, 2016

(65) Prior Publication Data

US 2018/0011644 A1     Jan. 11, 2018

(51) Int. Cl.
G06F 3/06     (2006.01)

(52) U.S. Cl.
CPC .......... *G06F 3/0619* (2013.01); *G06F 3/065* (2013.01); *G06F 3/0607* (2013.01); *G06F 3/067* (2013.01); *G06F 3/0635* (2013.01)

(58) Field of Classification Search
CPC ....... G06F 3/067; G06F 3/0635; H04L 41/12; H04L 67/1097
See application file for complete search history.

(56) References Cited

U.S. PATENT DOCUMENTS

| 2002/0129230 | A1* | 9/2002 | Albright | G06F 15/17343 |
| | | | | 713/1 |
| 2006/0182041 | A1* | 8/2006 | Graves | H04L 41/0893 |
| | | | | 370/254 |
| 2014/0059187 | A1 | 2/2014 | Rosset et al. | |
| 2015/0195366 | A1* | 7/2015 | Otsuka | H04L 49/357 |
| | | | | 709/225 |

(Continued)

OTHER PUBLICATIONS

Disclosed Anonymously, "Method and apparatus to determine Storage usage Backend Mapping by applications on Software Defined Storage Systems", IP.com No. IPCOM000240938D, Publication Date: Mar. 12, 2015; 12 pages.

(Continued)

*Primary Examiner* — Edward J Dudek, Jr.
(74) *Attorney, Agent, or Firm* — Cantor Colburn LLP

(57) ABSTRACT

An aspect of validating vHBA fabric zoning in a SAN includes receiving, by a computer processor, a request for data corresponding to zones in a storage area network to which an initiator in a host system computer has access; instantiating, by the computer processor, a virtual host bus adapter interface on the host system computer; and transmitting, via the virtual host bus adapter interface, the request to a fabric controller in the storage area network. An aspect also includes receiving a current active zone set from the fabric controller; parsing the current active zone set for the initiator; identifying, from the parsing, each of the zones in the current active zone set to which the initiator is indicated; and displaying the identified zones via the computer processor.

20 Claims, 8 Drawing Sheets

(56) References Cited

U.S. PATENT DOCUMENTS

2015/0261713 A1    9/2015    Kuch et al.

OTHER PUBLICATIONS

IBM, "A Feature for Selecting the Data Source of a Fabric ZoneSets Database from Multiple Types of Data Sources", IP.com No. IPCOM000146275D, Publication Date: Feb. 9, 2007; 3 pages.

List of IBM Patents or Patent Applictions Treated As Related; (Appendix P), Filed Jul. 12, 2016, 2 pages.

Ralph Friedrich, et al., Pending U.S. Appl. No. 15/206,563 entitled "Obtaining Optical Signal Health Data in a Storage Area Network," filed with the U.S. Patent and Trademark Office on Jul. 11, 2016.

\* cited by examiner

VALIDATING VIRTUAL HOST BUS ADAPTER FABRIC ZONING IN A STORAGE AREA NETWORK

STATEMENT REGARDING PRIOR DISCLOSURE BY THE INVENTORS

The following disclosure(s) are submitted under 35 U.S.C. § 102(b)(1)(A): DISCLOSURE: Expanding the IBM Systems' portfolio with additions to IBM z Systems and IBM LinuxONE, Feb. 16, 2016.

BACKGROUND

The present disclosure relates to computer networks, and more specifically, to methods, systems and computer program products for validating virtual host bus adapter (vHBA) fabric zoning in a storage area network (SAN).

SUMMARY

In accordance with an embodiment, a method for validating virtual host bus adapter (vHBA) fabric zoning in a SAN is provided. The method includes receiving, by a computer processor, a request for data corresponding to zones in a storage area network to which an initiator in a host system computer has access; instantiating, by the computer processor, a virtual host bus adapter interface on the host system computer; and transmitting, via the virtual host bus adapter interface, the request to a fabric controller in the storage area network. The method also includes receiving a current active zone set from the fabric controller; parsing the current active zone set for the initiator; identifying, from the parsing, each of the zones in the current active zone set to which the initiator is indicated; and displaying the identified zones via the computer processor.

In accordance with an embodiment, a system validating virtual host bus adapter (vHBA) fabric zoning in a SAN is provided. The system includes a memory having computer readable instructions, and a processor for executing the computer readable instructions, the computer readable instructions include receiving a request for data corresponding to zones in a storage area network to which an initiator in a host system computer has access; instantiating a virtual host bus adapter interface on the host system computer; and transmitting, via the virtual host bus adapter interface, the request to a fabric controller in the storage area network. The computer readable instructions further include receiving a current active zone set from the fabric controller; parsing the current active zone set for the initiator; identifying, from the parsing, each of the zones in the current active zone set to which the initiator is indicated; and displaying the identified zones via the computer processor.

In accordance with an embodiment, a computer program product for validating virtual host bus adapter (vHBA) fabric zoning in a SAN is provided. The computer program product includes a computer readable storage medium having program instructions embodied therewith, wherein the computer readable storage medium is not a transitory signal per se, the program instructions executable by a computer processor to cause the computer processor to perform a method. The method includes receiving a request for data corresponding to zones in a storage area network to which an initiator in a host system computer has access; instantiating a virtual host bus adapter interface on the host system computer; and transmitting, via the virtual host bus adapter interface, the request to a fabric controller in the storage area network. The method further includes receiving a current active zone set from the fabric controller; parsing the current active zone set for the initiator; identifying, from the parsing, each of the zones in the current active zone set to which the initiator is indicated; and displaying the identified zones via the computer processor.

BRIEF DESCRIPTION OF THE DRAWINGS

The forgoing and other features, and advantages of the disclosure are apparent from the following detailed description taken in conjunction with the accompanying drawings in which:

FIGS. 4-8 depict screenshots of an interface for validating vHBA fabric zoning in accordance with an exemplary embodiment.

DETAILED DESCRIPTION

In accordance with exemplary embodiments of the disclosure, methods, systems and computer program products for validating vHBA fabric zoning in a SAN are provided. A SAN refers to a collection of storage devices that are communicatively interconnected to enable shared use of their resources. Fabric zoning refers to the partitioning of the SAN into small subsets or subnetworks in order to limit interference in data transmission, enhance network security, and to simplify management. Access control functions are defined by the way the fabric is zoned. In other words, access by a particular host system computer or channel to network devices is limited based on assigned zones. With constantly shifting configurations of the SAN to accommodate changing needs, it is not uncommon for some endpoints, such as host system computers, to have inadvertent access to one or more of the zones; that is, performing zone assignments and re-zoning of the SAN by an administrator may result in unintended access by some endpoints. This can cause unnecessary activity due to additional workloads, which can slow down the overall performance of the SAN. In addition, this can cause a negative impact on security of the SAN. The embodiments described herein provide a way to query the SAN to determine which zones a particular host system computer has access to so that corrective action can be taken. These, and other aspects of the embodiments will now be described.

Figure 1:
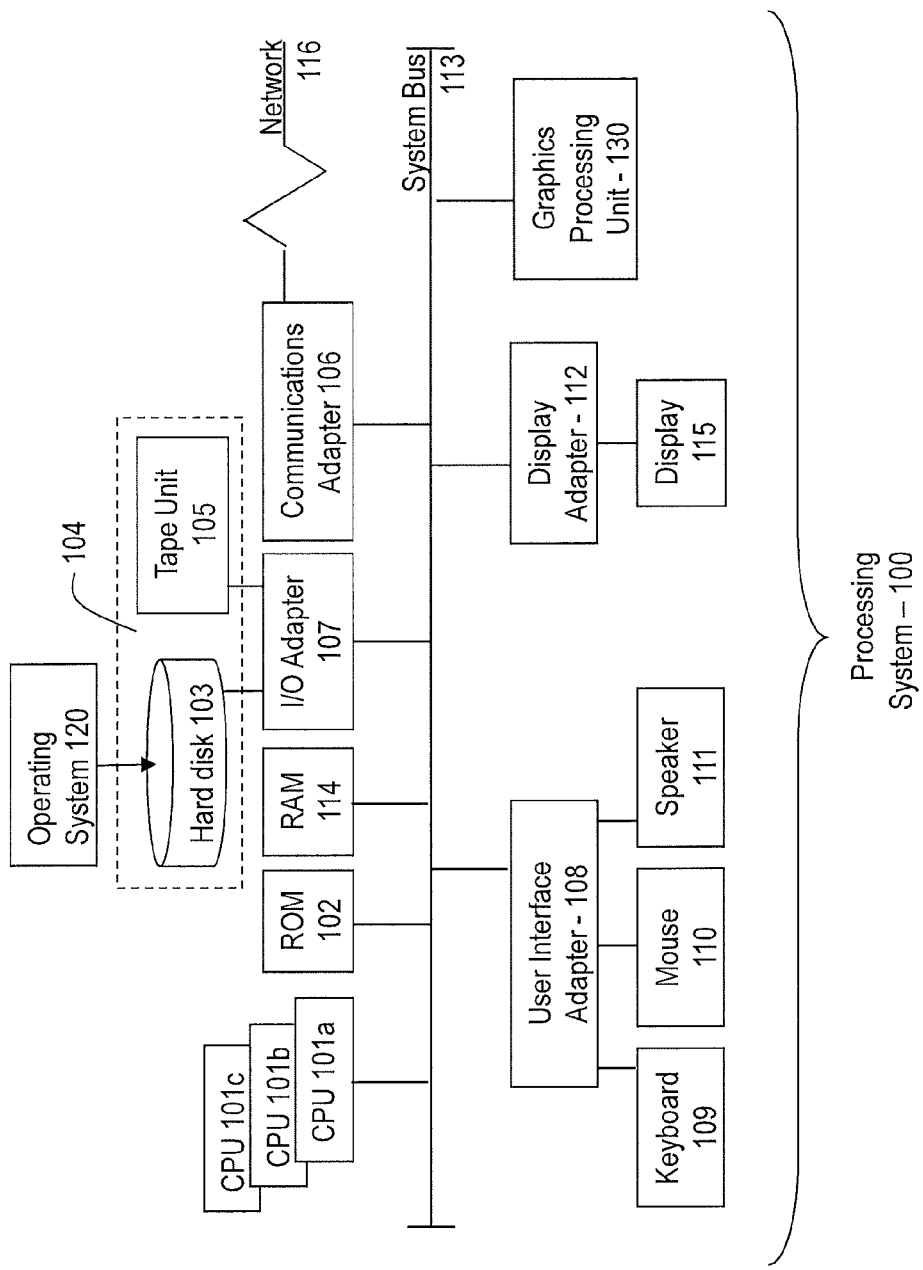
FIG. 1 is a block diagram illustrating one example of a processing system in accordance with an embodiment.

Referring to FIG. 1, there is shown an embodiment of a processing system 100 for implementing the teachings herein in accordance with an embodiment. In this embodiment, the system 100 has one or more central processing units (processors) 101*a*, 101*b*, 101*c*, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adapter 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics-processing unit 130. Graphics processing unit 130 is a specialized electronic circuit designed to manipulate and alter memory to accelerate the creation of images in a frame buffer intended for output to a display. In general, graphics-processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
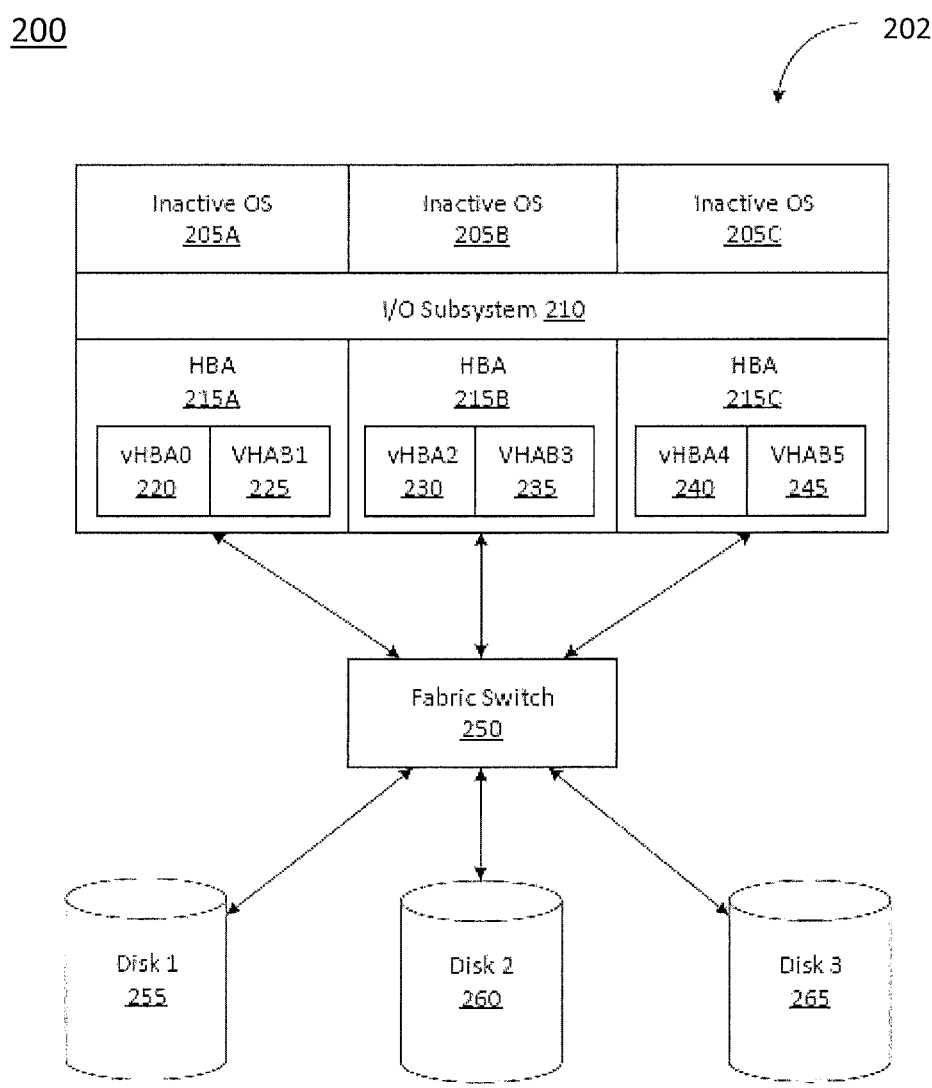
FIG. 2 is a block diagram illustrating a more detailed example of a processing system in accordance with an embodiment.

Turning now to FIG. 2, a block diagram illustrating a more detailed example of a processing system for practice of the teachings herein will now be described in an embodiment. The processing system of FIG. 2 illustrates a sample SAN 200 that includes a host system computer 202, a fabric switch 250, and disk drives 255, 260, and 265. An operating system (OS) of the host system computer 202 is virtualized to represent respective inactive operating systems (OSs) 205A-205C. The OSs 205A-205C communicate with corresponding physical host bus adapters (HBAs) 215A-215C through an input/output (I/O) subsystem 210. Each HBA 215A-215C represents a physical host bus adapter with related circuitry that facilitates data transfer between the host system computer 202 and other network elements, such as switch 250, and disks 255, 260, and 265. Each HBA 215A-215C initiates and sends service task management requests to target devices (e.g., disks 255, 260, and 265). In a virtualized environment, each HBA 215A, 215B, and 215C is implemented as multiple virtual HBAs (vHBAs), illustrated respectively as 220, 225, 230, 235, 240, and 245. Each virtual HBA is separately and independently addressable by network elements.

Each disk drive may contain multiple disk arrays, as well as multiple ports through which one or more network elements is granted access. The switch 250 is a hardware device that enables multiple hosts to communicate with multiple disks. The host system computer 202, switch 250, and disks 255, 260, and 265 are communicatively coupled to one another using fiber optic cables and transceivers (not shown). In an embodiment, the switch 250 implements a fabric controller (not shown) to enable these communications.

For ease of description, the SAN 200 described in FIG. 2 illustrates a simplified embodiment of the network elements that may reside therein. It is understood that the SAN 200 may incorporate multiple host system computers, switches, and storage devices.

Figure 3:
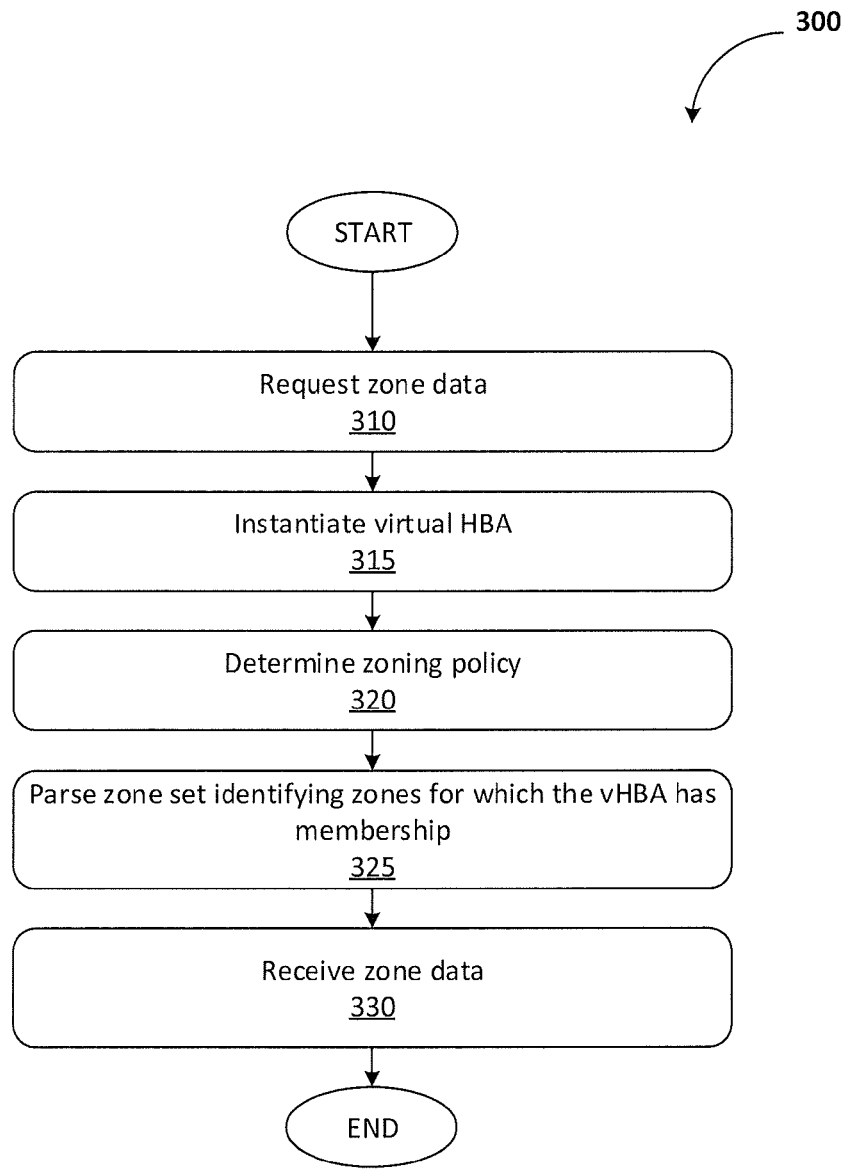
FIG. 3 is a block diagram illustrating a method for validating virtual host bus adapter (vHBA) fabric zoning in a SAN in accordance with an exemplary embodiment.

FIG. 3 is a block diagram illustrating a method for validating vHBA fabric zoning in a SAN in accordance with an embodiment. The process 300 begins when a user desires to obtain information about the zones in the SAN to which a particular initiator has access. The initiator refers to an entity on the host system computer. In an embodiment, the initiator is a vHBA. The access to network devices in the SAN may be pre-assigned by a system administrator, e.g. via an access control system. In an embodiment, the administrator places the initiator, as well as target devices on the network into groupings and manages the assignments based on identifiers, such as port names, channel identifiers, or other indicia. In an embodiment, the initiators and target devices may be each assigned to multiple zones in the network. The user may request the zoning information to determine or assess whether modifications of zone assignments should be made to improve overall performance and/or security of the SAN.

In block 310, the host system computer receives a request for data corresponding to zones in a storage area network to which an initiator in a host system computer has access. Network devices that make up these zones may include one or more storage arrays, switches, transceivers, and optical fiber connections.

In block 315, a processor of the host system computer instantiates a virtual host bus adapter on the host system computer absent a boot of the operating system, which otherwise is needed to activate a virtual host bus adapter on a physical host bus adapter (and from which operating system a request to the virtual host bus adapter would be issued). In an embodiment, the processor may form part of a physical host bus adapter.

In block 320, the vHBA sends a request to the SAN via the fabric controller for the zoning policy and the active zone set with respect to the initiator.

The computer processor receives the current active zone set from the fabric controller in response to the request and, in block 325, the current active zone set is parsed to extract the data that corresponds to the requested initiator, and each of the zones in the current active zone set to which the initiator is indicated is identified. In an embodiment, the virtual host bus adapter identifies each of the elements in the storage area network to which the host system computer has access based on address data corresponding to ports of the elements that are assigned for use/access by the host system computer. In block 330, the results from block 325 are displayed for the user, e.g., on the host system computer.

Once this information is available, it can be determined which if any of the initiators should be removed from a zone that appears in the results. Likewise, the results can be used to determine that an initiator should have access to a zone which does not appear in the results. The initiator can then be added to the desired zone. In an embodiment, the user may determine whether any zone reassignment or modification was successful by re-invoking the request for data and comparing the data values before and after the reassignment takes place.

Figure 4:
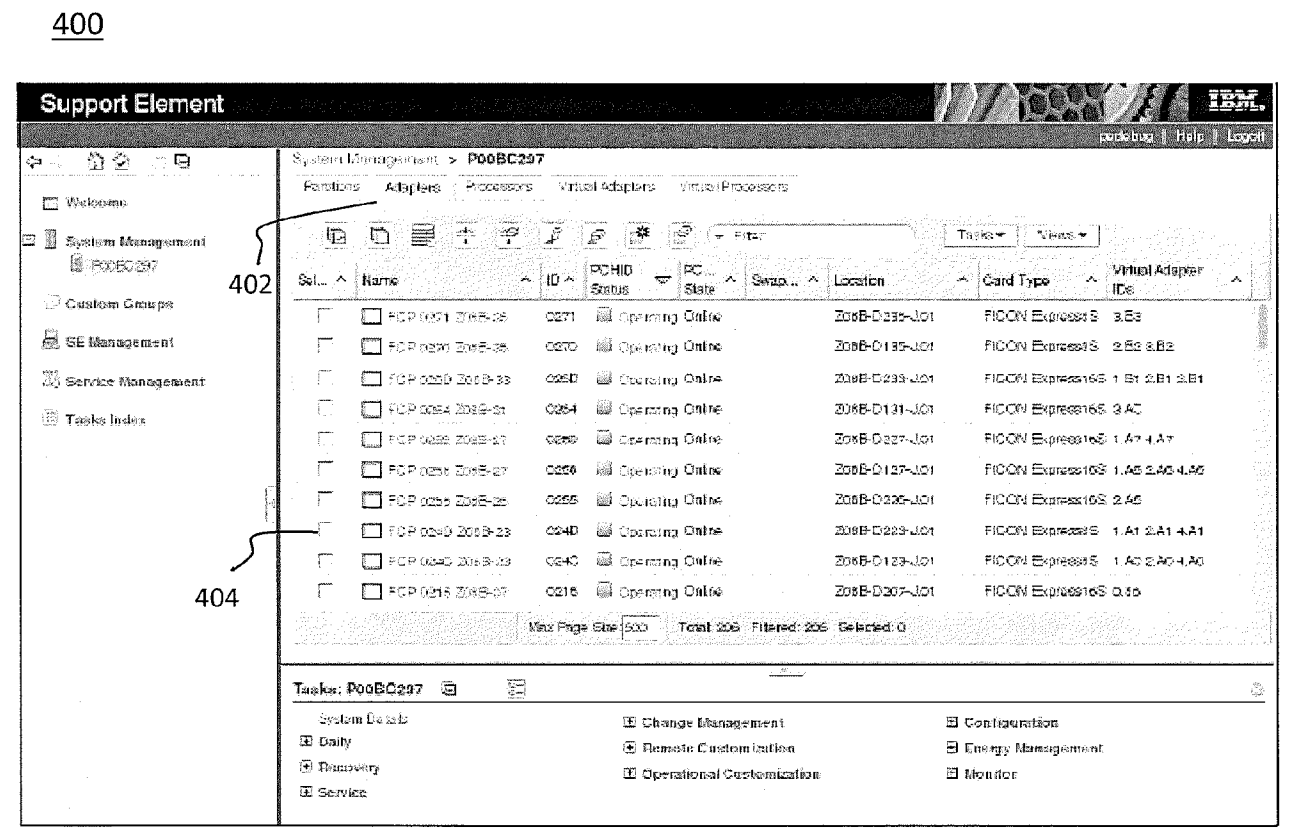
Figure 5:
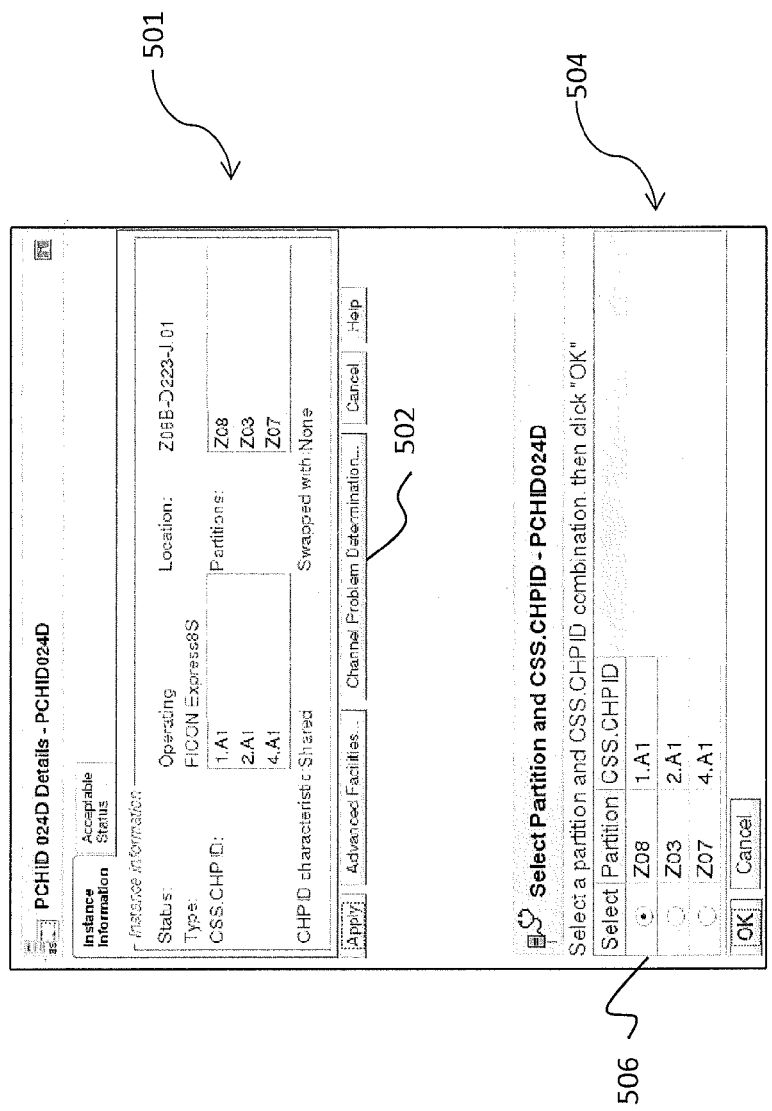
Figure 6:
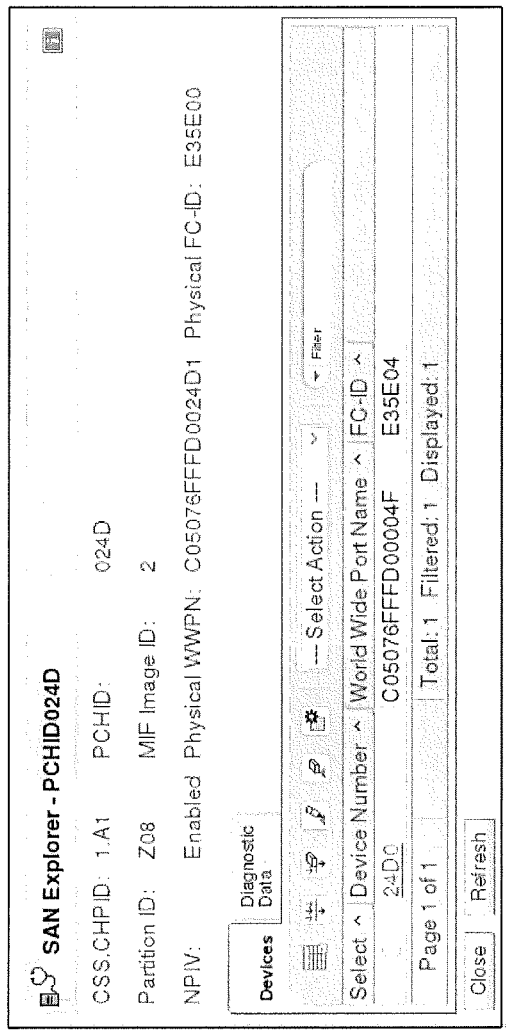
Figure 7:
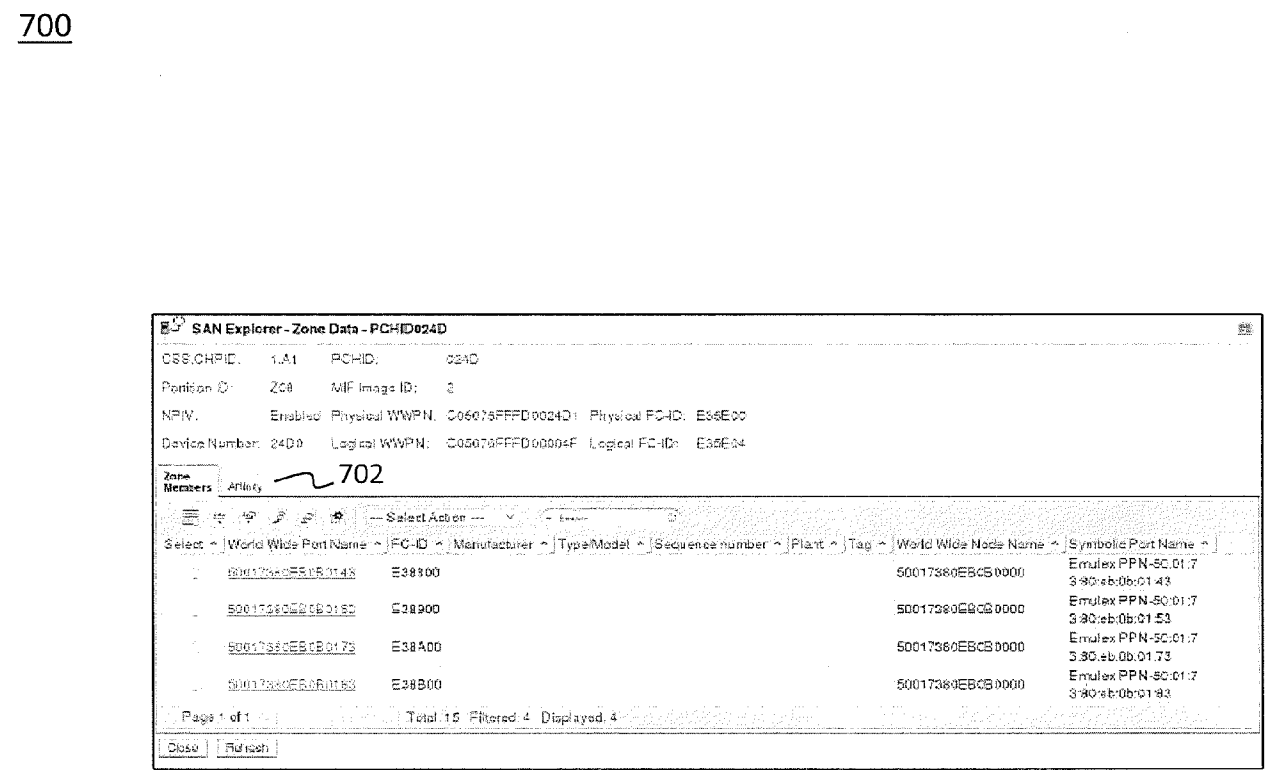
Figure 8:
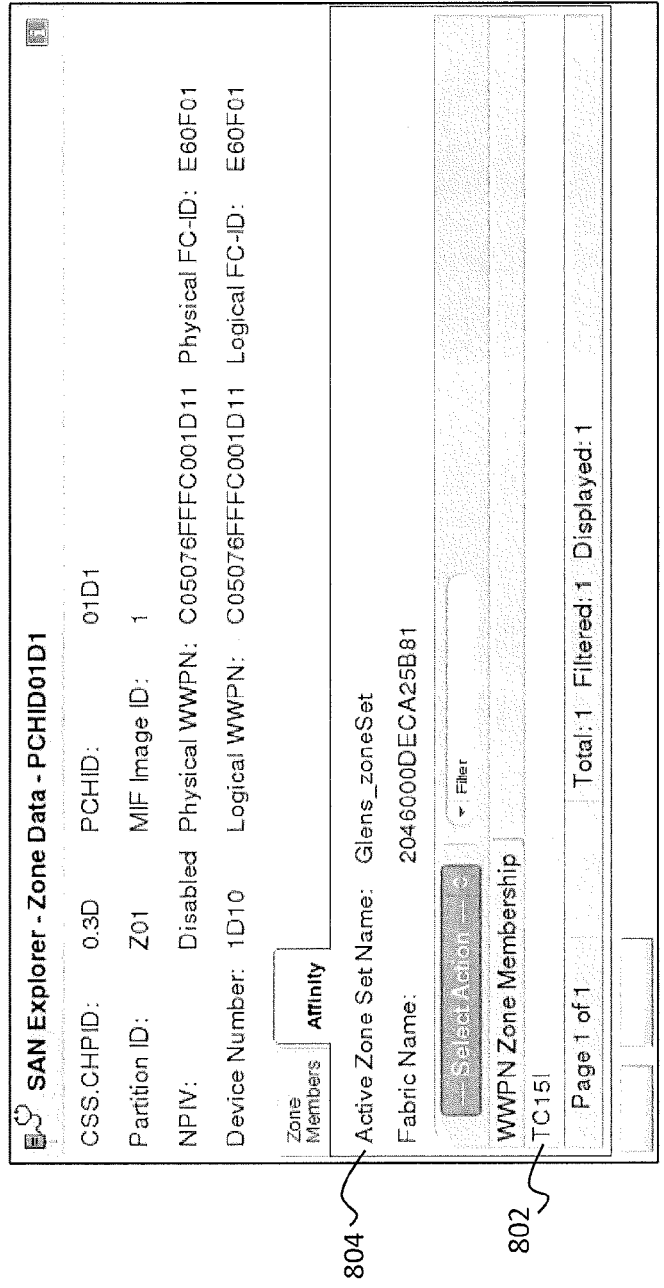

Turning now to FIGS. 4-8, user interface screens for validating vHBA fabric zoning will now be described. FIG. 4 depicts a user interface screen 400 and, via selection of a tab 402, presents a view of the host system's physical HBAs. A user may select a physical HBA from the view, which is shown as option selection 404. Once the physical HBA is selected, a diagnostic panel 501 in a window 500 illustrated in FIG. 5 is presented to the user. Through the panel 501, a user can select "Channel Problem Determination" option 502, which results in the display of a Logical Partition dialog 504. The Logical Partition dialog 504 represents a listing of host operating systems. The user can select from this listing, e.g., illustratively shown as option 506, and a listing of vHBAs available for the logical partition is presented in FIG. 6. The listing of vHBAs can range from 1-64 available vHBAs. By selecting a vHBA from the listing, a table 700 of available initiators and targets that share zoning with the selected vHBA is shown in FIG. 7. The user may select an "affinity" table 702, which results in the display of a listing of zones that were identified by the vHBA to which it has membership.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   receiving, by a computer processor of a host system computer, a request for data corresponding to zones in a storage area network to which a virtual bus adapter interface in the host system computer has access, wherein the host system computer includes a physical host bus adapter that is associated with an inactive operating system of the host system computer, wherein the physical host bus adapter is virtualized by a plurality of virtual host bus adapter interfaces;
   instantiating, by the computer processor of the host system computer, the virtual host bus adapter interface of the plurality of virtual host bus adapters without booting the inactive operating system that is associated with the physical host bus adapter;
   transmitting, via the virtual host bus adapter interface, the request to a fabric controller in the storage area network;
   receiving, by the computer processor of the host system, a current active zone set from the fabric controller;
   parsing the current active zone set for the virtual host bus adapter interface;
   identifying, from the parsing, via the virtual host bus adapter interface of the host system computer, each of the zones in the current active zone set to which the virtual host bus adapter interface is indicated; and
   displaying the identified zones via the computer processor.

2. The computer-implemented method of claim 1, wherein the host system computer is associated with a plurality of physical host bus adapters, wherein the method further comprising:
   displaying, via the computer processor, a listing of the plurality of physical host bus adapters that are associated with the host system computer;
   receiving a user-selected physical host bus adapter from the listing of the plurality of physical host bus adapters; and
   in response to the user-selected physical host bus adapter, displaying a listing of virtual host bus adapt interfaces that are associated with the user-selected physical host bus adapter;
   wherein the receiving the request for data includes receiving a user-selected virtual host bus adapter interface from the listing of virtual host bus adapter interfaces.

3. The computer-implemented method of claim 1, wherein each of the zones is represented as a collection of ports on at least one of a storage array, switch, and transceiver in the storage area network.

4. The computer-implemented method of claim 1, further comprising:
   modifying assignment of the virtual host bus adapter interface with respect to each of the zones in the current active zone set to which the virtual host bus adapter interface is indicated based on performance values associated with operation of the storage area network.

5. The computer-implemented method of claim 1, wherein the transmitting the request via the virtual host bus adapter interface is implemented absent engagement between the operating system and the physical host bus adapter.

6. The computer-implemented method of claim 1, further comprising:
   re-invoking the request for data corresponding to the zones in the storage area network to which the virtual host bus adapter interface has access, and comparing response data received with the identified zones to verify success of any modifications taken for the virtual host bus adapter interface.

7. The computer-implemented method of claim 1, further comprising:
   identifying each port in the current active zone set to which the host system computer has access based on address data corresponding to the ports.

8. A host system computer, comprising:
   a physical host bus adapter that is associated with an inactive operating system, wherein the physical host bus adapter is virtualized by a plurality of virtual host bus adapter interfaces;
   a memory having computer readable instructions; and
   a processor for executing the computer readable instructions, the computer readable instructions including:
      receiving a request for data corresponding to zones in a storage area network to which a virtual bus adapter interface in the host system computer has access;
      instantiating the virtual host bus adapter interface of the plurality of virtual host bus adapters without booting the inactive operating system that is associated with the physical host bus adapter;
      transmitting, via the virtual host bus adapter interface, the request to a fabric controller in the storage area network;
      receiving a current active zone set from the fabric controller;
      parsing the current active zone set for the virtual host bus adapter interface;
      identifying, from the parsing, via the virtual host bus adapter interface of the host system computer, each of the zones in the current active zone set to which the virtual host bus adapter interface is indicated; and
      displaying the identified zones via the computer processor.

9. The host system computer of claim 8, wherein the host system computer is associated with a plurality of physical host bus adapters, wherein the computer readable instructions further include:
   displaying, via the computer processor, a listing of a plurality of physical host bus adapters that are associated with the host system computer;

receiving a user-selected physical host bus adapter from the listing of the plurality of physical host bus adapters; and in response to the user-selected physical host bus adapter, displaying a listing of virtual host bus adapter interfaces that are associated with the user-selected physical host bus adapter;

wherein the receiving the request for data includes receiving a user-selected virtual host bus adapter interface from the listing of virtual host bus adapter interfaces.

10. The host system computer of claim 8, wherein each of the zones is represented as a collection of ports on at least one of a storage array, switch, and transceiver in the storage area network.

11. The host system computer of claim 8, wherein the computer readable instructions further include:

modifying assignment of the virtual host bus adapter interface with respect to each of the zones in the current active zone set to which the virtual host bus adapter interface is indicated based on performance values associated with operation of the storage area network.

12. The host system computer of claim 8, wherein the transmitting the request via the virtual host bus adapter interface is implemented absent engagement between the operating system and the physical host bus adapter.

13. The host system computer of claim 8, wherein the computer readable instructions further include:

re-invoking the request for data corresponding to the zones in the storage area network to which the virtual host bus adapter interface has access, and comparing response data received with the identified zones to verify success of any modifications taken for the virtual host bus adapter interface.

14. The host system computer of claim 8, wherein the computer readable instructions further include:

identifying each port in the current active zone set to which the host system computer has access based on address data corresponding to the ports.

15. A computer program product comprising a computer readable storage medium having program instructions embodied therewith, wherein the computer readable storage medium is not a transitory signal per se, the program instructions executable by one or more computer processors of a host system computer to cause the host system computer to perform a method, comprising:

receiving a request for data corresponding to zones in a storage area network to which a virtual bus adapter interface in the host system computer has access, wherein the host system computer includes a physical host bus adapter and an inactive operating system that is associated with the physical host bus adapter, wherein the physical host bus adapter is virtualized by a plurality of virtual host bus adapter interfaces;

instantiating the virtual host bus adapter interface of the plurality of virtual host bus adapters without booting the inactive operating system that is associated with the physical host bus adapter;

transmitting, via the virtual host bus adapter interface of the host system computer, the request to a fabric controller in the storage area network;

receiving a current active zone set from the fabric controller;

parsing the current active zone set for the virtual host bus adapter interface;

identifying, from the parsing, via the virtual host bus adapter interface of the host system computer, each of the zones in the current active zone set to which the virtual host bus adapter interface is indicated; and displaying the identified zones via the host computer system.

16. The computer program product of claim 15, wherein the host system computer is associated with a plurality of physical host bus adapters, wherein the program instructions executable by the host system computer further cause the host system computer to perform:

displaying, via the computer processor, a listing of the plurality of physical host bus adapters that are associated with the host system computer;

receiving a user-selected physical host bus adapter from the listing of the plurality of physical host bus adapters; and in response to the user-selected physical host bus adapter, displaying a listing of virtual host bus adapter interfaces that are associated with the user-selected physical host bus adapter;

wherein the receiving the request for data includes receiving a user-selected virtual host bus adapter interface from the listing of virtual host bus adapter interfaces.

17. The computer program product of claim 15, wherein each of the zones is represented as a collection of ports on at least one of a storage array, switch, and transceiver in the storage area network.

18. The computer program product of claim 15, wherein the program instructions executable by a computer processor further cause the computer processor to perform:

modifying assignment of the virtual host bus adapter interface with respect to each of the zones in the current active zone set to which the virtual host bus adapter interface is indicated based on performance values associated with operation of the storage area network.

19. The computer program product of claim 15, wherein the transmitting the request via the virtual host bus adapter interface is implemented absent engagement between the operating system and the physical host bus adapter.

20. The computer program product of claim 15, wherein the program instructions executable by a computer processor further cause the computer processor to perform:

re-invoking the request for data corresponding to the zones in the storage area network to which the virtual host bus adapter interface has access, and comparing response data received with the identified zones to verify success of any modifications taken for the virtual host bus adapter interface.

* * * * *